(12) United States Patent
Biegler et al.

(10) Patent No.: US 11,618,237 B2
(45) Date of Patent: Apr. 4, 2023

(54) CO-EXTRUDED MULTILAYER ARTICLES INCLUDING CONTINUOUS LAYER AND DISCONTINUOUS LAYER

(71) Applicant: 3M INNOVATIVE PROPERTIES COMPANY, St. Paul, MN (US)

(72) Inventors: Robert M. Biegler, Woodbury, MN (US); Mark A. Hoisington, Austin, TX (US); Craig R. Hoff, Corcoran, MN (US); Anton F. Jachim, St. Paul, MN (US); Jeffrey M. Maki, Inver Grove Heights, MN (US); Derek W. Patzman, Savage, MN (US); Thomas J. Blong, Woodbury, MN (US); Jay M. Jennen, Forest Lake, MN (US); Erik A. Aho, New Richmond, WI (US); David V. Mahoney, Austin, TX (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 66 days.

(21) Appl. No.: 16/810,137

(22) Filed: Mar. 5, 2020

(65) Prior Publication Data

US 2020/0282691 A1     Sep. 10, 2020

Related U.S. Application Data

(60) Provisional application No. 62/813,944, filed on Mar. 5, 2019.

(51) Int. Cl.
*B32B 3/14* (2006.01)
*B32B 1/08* (2006.01)
(Continued)

(52) U.S. Cl.
CPC .............. *B32B 3/14* (2013.01); *B29C 48/10* (2019.02); *B29C 48/32* (2019.02); *B32B 1/08* (2013.01);
(Continued)

(58) Field of Classification Search
CPC ....... B29C 48/10; B29C 48/32; B29C 48/022; B29C 48/09; B29C 48/21; B29C 48/2556;
(Continued)

(56) References Cited

U.S. PATENT DOCUMENTS 3,828,036 A * 8/1974 Stent .................... C07D 513/20
544/6
4,435,241 A    3/1984 Corbett
(Continued)

FOREIGN PATENT DOCUMENTS

CA     1035515 A     8/1978
CA     2347024 A1    11/1995
(Continued)

OTHER PUBLICATIONS

International Search Report for PCT Application No. PCT/IB2020/051924, dated Jun. 2, 2020, 5 pp.
(Continued)

*Primary Examiner* — Yan Lan
(74) *Attorney, Agent, or Firm* — Gregg H. Rosenblatt

(57) ABSTRACT

This disclosure describes co-extruded multilayer articles including at least one continuous layer and one discontinuous layer, as well as systems and techniques for the manufacture of co-extruded multilayer articles. For example, a co-extruded multilayer article is described that includes a body having a plurality of layers, where a first layer of the plurality of layers is formed from a first material and is continuous along a longitudinal axis of the body, and a second layer of the plurality of layers is formed from a
(Continued)

second material and is discontinuously co-extruded along the longitudinal axis.

11 Claims, 14 Drawing Sheets

(51) Int. Cl.
  *B32B 27/06* (2006.01)
  *B32B 27/08* (2006.01)
  *H01B 9/02* (2006.01)
  *H01B 13/14* (2006.01)
  *B29C 48/32* (2019.01)
  *B29C 48/10* (2019.01)
  *B29L 23/00* (2006.01)

(52) U.S. Cl.
  CPC ............. *B32B 27/06* (2013.01); *B32B 27/08* (2013.01); *H01B 9/02* (2013.01); *H01B 9/027* (2013.01); *H01B 13/141* (2013.01); *B29L 2023/001* (2013.01); *B32B 2307/202* (2013.01); *B32B 2307/206* (2013.01); *B32B 2597/00* (2013.01)

(58) Field of Classification Search
  CPC . B29C 48/2694; B29C 48/301; B29C 48/304; B29C 48/338; B29C 48/49; B29L 2023/001; B29L 2009/00; B29L 2031/34; B32B 1/08; B32B 2307/202; B32B 2307/206; B32B 2597/00; B32B 27/06; B32B 27/08; B32B 3/14; H01B 13/141; H01B 9/02; H01B 9/027; B29K 2995/0005; B29K 2995/0006; B29K 2995/0007; Y10T 428/24802
  See application file for complete search history.

(56) References Cited

U.S. PATENT DOCUMENTS

| | | |
|---|---|---|
| 4,824,616 A | 4/1989 | Shimizu |
| 5,034,179 A | 7/1991 | Richter |
| 5,204,120 A | 4/1993 | Hirschberger |
| 5,533,985 A | 7/1996 | Wang |
| 5,852,698 A * | 12/1998 | Bringuier ............. G02B 6/4436 385/113 |
| 6,135,992 A | 10/2000 | Wang |
| 6,547,551 B2 | 4/2003 | Omi |
| 8,401,353 B2 * | 3/2013 | Barker ................. G02B 6/4471 385/110 |
| 8,618,200 B2 | 12/2013 | Guenther et al. |
| 9,774,749 B1 | 9/2017 | Skrainar |
| 2013/0115353 A1 | 5/2013 | Boudy et al. |
| 2014/0127437 A1 | 5/2014 | Malfait et al. |
| 2015/0056432 A1 | 2/2015 | Solberg |
| 2016/0139181 A1* | 5/2016 | Gravermann ...... G01R 27/2605 324/686 |
| 2018/0169376 A1 | 6/2018 | Beeckler et al. |

FOREIGN PATENT DOCUMENTS

| | | | |
|---|---|---|---|
| CN | 1071365 A1 | | 4/1993 |
| DE | 3940237 A1 | | 6/1991 |
| EP | 0491093 A1 | | 6/1992 |
| GB | 1 281 682 | | 7/1972 |
| GB | 1 370 281 | | 10/1974 |
| GB | 1406642 A | | 9/1975 |
| JP | 08-174630 A | | 9/1996 |
| WO | WO 95/24392 | | 9/1995 |
| WO | WO95/24302 | * | 3/1999 |
| WO | 2011079418 A1 | | 7/2011 |
| WO | 2018091140 A1 | | 5/2018 |

OTHER PUBLICATIONS

S. Middleman, *Fundamentals of Polymer Processing*, McGraw-Hill (1977), p. 123.

F. Rodriguez, *Principles of Polymer Systems, $2^{nd}$ Edition*, Hemisphere Publishing Corp. (1982), p. 330 and p. 348.

Search Report for CN Appl. No. 202080018868.8, dated Oct. 17, 2022, 4 pp.

* cited by examiner

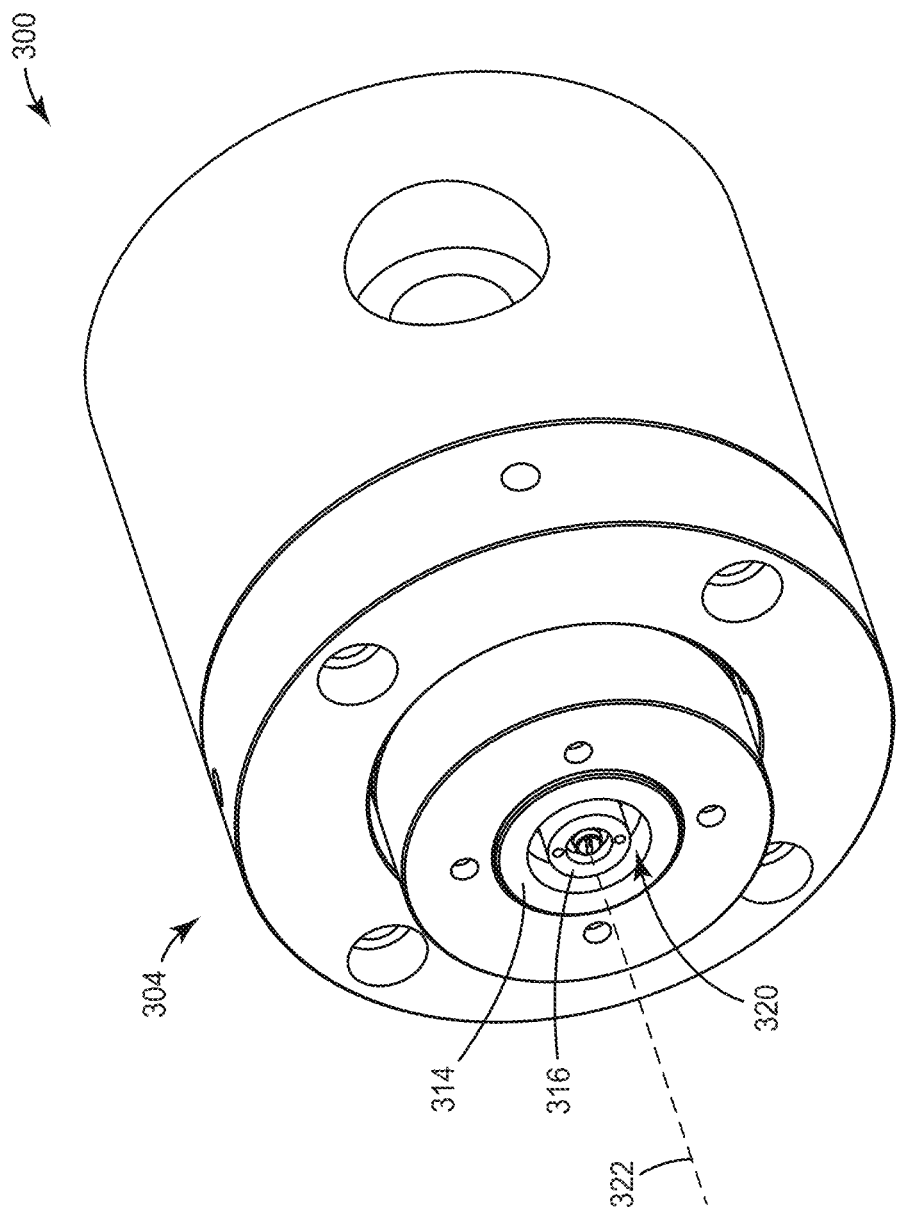

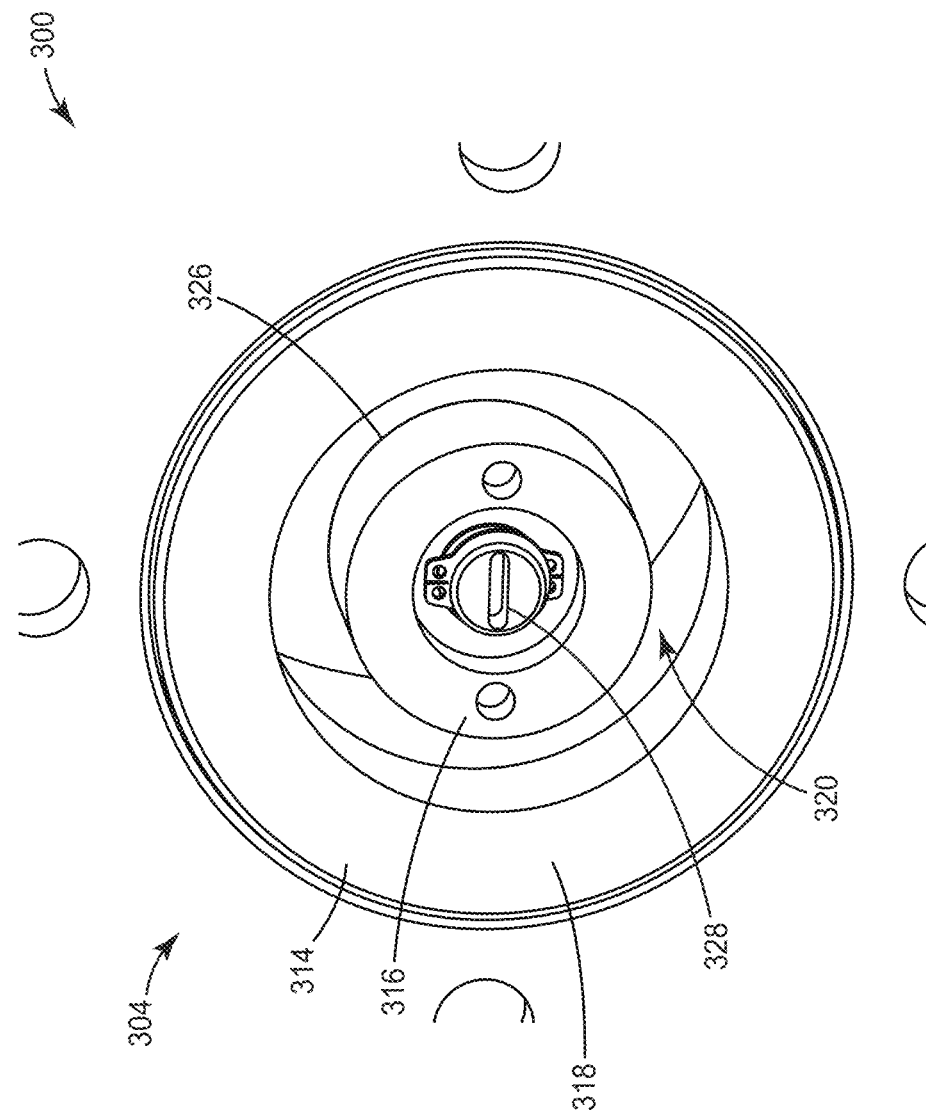

CO-EXTRUDED MULTILAYER ARTICLES INCLUDING CONTINUOUS LAYER AND DISCONTINUOUS LAYER

TECHNICAL FIELD

The present disclosure relates to co-extruded multilayer articles, including co-extruded multilayer articles used with insulated power cables.

BACKGROUND

Multilayered articles include two to more material layers. Each layer may be selected to have unique chemical properties, electrical properties, mechanical properties, physical properties, or combinations thereof. In some examples, multilayer articles may be formed by multi-step injection molding, post-extrusion processing, such as material addition or material removal, or assembly of multiple layers. In general, extrusion is thought of to make continuous shapes or profiles, while a molding or shaping process is required to make 3-dimensional articles that are discontinuous and intermittent. Both are well known processes, what is contemplated herein is a continuous process that enables the introduction of intermittent features. See e.g., Stanley Middleman, *Fundamentals of Polymer Processing*, McGraw-Hill (1977) and Ferdinand Rodriguez, *Principles of Polymer Systems*, Hemisphere Publishing Corp. (1982). Coextrusion techniques are also known. U.S. Pat. Nos. 5,533,985 and 6,135,992 describe differential stiffness tubing for medical products, where the tubing is made using a resin modulating system and a co-extrusion head.

SUMMARY

This disclosure describes co-extruded multilayer articles including at least one continuous layer and one discontinuous layer, as well as systems and techniques for the manufacture of co-extruded multilayer articles. The continuous layer includes a first material, such as an electrically insulative polymeric material, which may also contain a filler or modifier, and the discontinuous layer includes a second, different material, such as a conductive material, an insulating material, a semiconductive material, or a high dielectric constant ("high-K") material. The location, geometry, and dimensions of the discontinuous layer may be configured to provide selected chemical, electrical, thermal, optical or mechanical properties. Co-extruding the multilayer article may reduce manufacturing cost, reduce manufacturing time, improve control of the location, geometry, and dimensions of the discontinuous layer, improve control of the longitudinal profile and/or axial profile of the discontinuous layer, and/or improve uniformity of a plurality of articles compared to multilayer articles formed using other methods.

In some examples, the disclosure describes a co-extruded multilayer article including a body having a plurality of layers, where a first layer of the plurality of layers is formed from a first material and is continuous along a longitudinal axis of the body, and a second layer of the plurality of layers is formed from a second material and is discontinuously co-extruded along the longitudinal axis.

In some examples, the disclosure describes a co-extruded multilayer tube that includes a first layer extending continuously along a longitudinal axis from a first terminal edge of the tube to a second terminal edge of the tube, where the first layer includes a first material defining an interior surface concentric to the longitudinal axis, and a second layer extending discontinuously along a portion of the interior surface of the first layer from a first terminal edge to a second terminal edge, where the second layer includes a second material.

While the exemplary body structure described herein comprises a tube or elongate tube structure, in alternative embodiments, the body may comprise a film, sheet, rod, fiber, or profile.

In some examples, the disclosure describes a co-extrusion system that includes an external die body including a first distal surface defining a first orifice transverse to a longitudinal axis, where the first orifice is fluidly coupled to a first flow channel; and an internal die body that includes a second distal surface defining a second orifice positioned concentrically within the first orifice and fluidly coupled to a second flow channel; an inner pin extending from a proximal end to a distal end along the longitudinal axis and positioned concentrically within the second orifice, the inner pin including a proximal lip extending transverse to the longitudinal axis from an inner diameter less than the diameter of the second orifice to an outer diameter greater than a diameter of the second orifice; and a die land extending distally from the proximal lip to a terminal edge, where the inner pin is moveable between a first position configured to fluidly decouple the second orifice from the first orifice, and a second position configured to fluidly couple the second orifice to the first orifice.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

FIGS. 3A-3C are conceptual diagrams illustrating a die of an example co-extrusion system including an inner pin operable in a rotary configuration.

Figure 1:
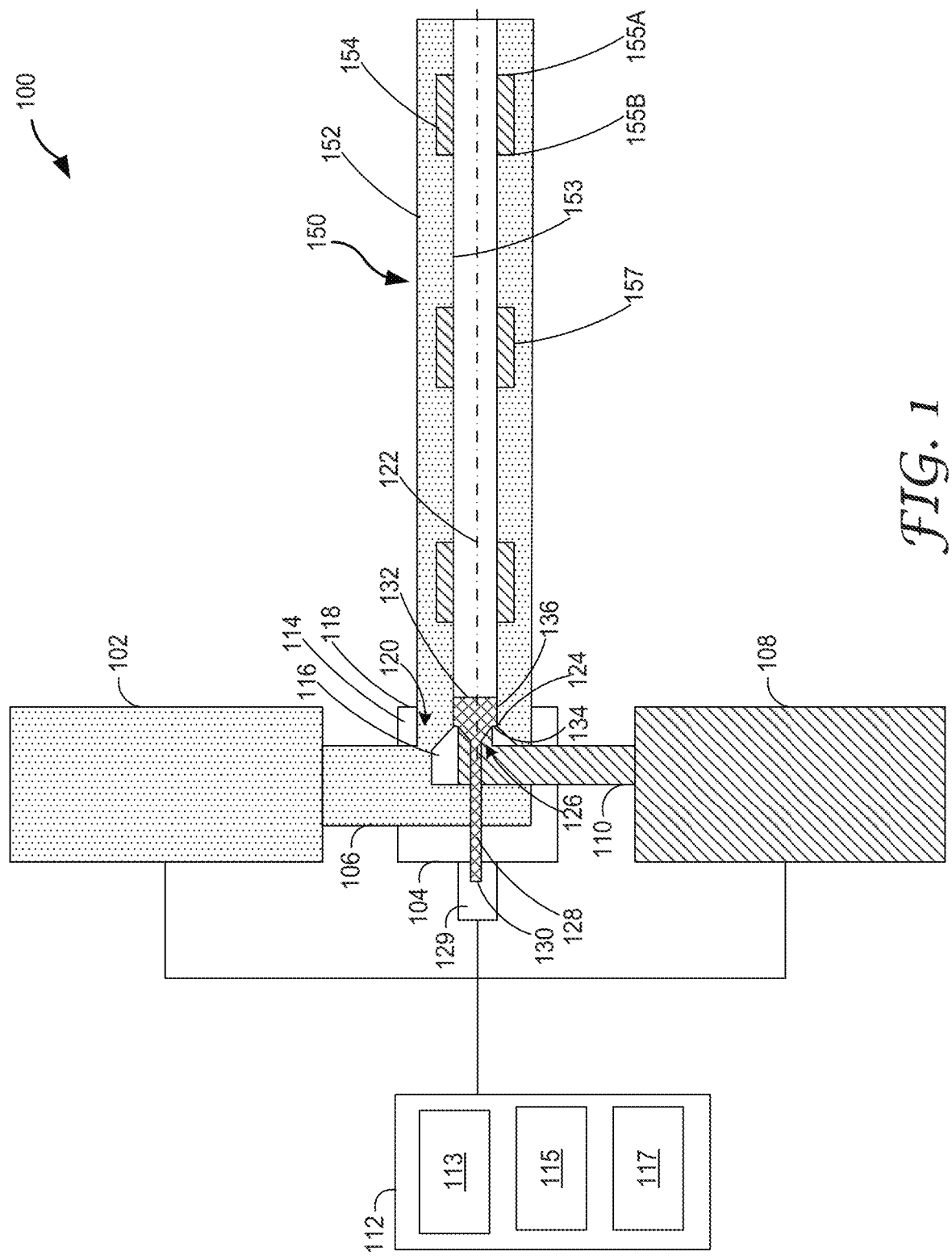
FIG. 1 is a conceptual and schematic diagram illustrating a cross sectional view of an example co-extrusion system for co-extruding a multilayered article.

It is to be understood that the embodiments may be utilized, and structural changes may be made without departing from the scope of the invention. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

This disclosure describes co-extruded multilayer articles including at least one continuous layer and one discontinuous layer, as well as systems and techniques for the manufacture of co-extruded multilayer articles. The discontinuous layer is embedded within, at least partially embedded within, or formed adjacent to the continuous layer. The co-extruded multilayer articles may be formed in a variety of shapes, sizes, and profiles, such as in tubular or substantially planar (film) form. In some examples, co-extruded multilayer articles may be used in electrical cable splice or joint bodies ("splice bodies") or electrical cable terminations ("terminations"), collectively "cable accessories," used in insulated power cables. Insulated power cables may include components configured to transmit electrical power (e.g., between about 600 volts (V) and about 1 kV, between about 1 kV and about 69 kV, or greater than about 69 kV) from a power source (e.g., a power plant) to a power consumer (e.g., a power distribution station, a business, or a home). However, some insulated power cables may be configured to transmit electrical power over any selected voltage and/or selected frequency range. A cable accessory may include a continuous layer including an electrically insulative polymeric material and a discontinuous layer defining an electrode including a conductive material, a semiconductive material, or a high dielectric constant ("high-K") material. Failure of electrical cables and cable accessories may occur as an arc or discharge across the electrical cable or cable accessory due to thermal runaway of the connector, dielectric breakdown in a cable accessory, dielectric breakdown in electrical cable insulation, or interface breakdown (also known as internal tracking). The cause failure events may include design flaws or defects introduced in the manufacturing process (e.g., flaws or defects in an electrode defined by the discontinuous layer of an electrical cable splice) or errors performed during installation or servicing of the electrical cable or cable accessory. Improved uniformity in the manufacture of cable accessories, improved control of forming discontinuous layers of a multilayer article, or both may reduce failure events.

In some examples, the continuous layer is configured to surround a splice of two electrical cables to support and/or protect the splice. The discontinuous layer includes a material configured to enhance the performance of the splice, such as, for example, a conductive material, a semiconductive material, an insulation material, or a high-K material. The terminal edges of the discontinuous layer are transverse to the longitudinal axis of the electrical cable splice. The terminal edges may be discrete, e.g., smooth edge profiles in the longitudinal direction (or machine direction, as used in film-making) and substantially uniform thickness in the axis direction. The longitudinal profile and/or axial profile of the terminal edges may include a shaped profile, such as a tapered profile or rounded profile. In operation, the longitudinal profile and/or axial profile may reduce concentration of electrical stress, reduce partial discharge events, or both. For example, the terminal edges of the discontinuous layer may be substantially free of smearing, trailing, flashing or other distortions that could otherwise create unwanted electrical fields, which may cause concentration of electrical stress that can result in partial discharge events or other failure of the device. As used herein, a partial discharge event refers to a current discharge that only partially bridges the gap between electrodes of an electrical cable (e.g., which may be caused by a gas discharge in a void of the electrical cable). Co-extruding the multilayer article may reduce manufacturing cost, reduce manufacturing time, improve control of the location, geometry, and dimensions of the discontinuous layer, improve control of the longitudinal profile and/or axial profile of the discontinuous layer, and/or improve uniformity of a plurality of articles, compared to multilayer articles formed using other methods.

FIG. 1 is a conceptual and schematic diagram illustrating a cross sectional view of an example co-extrusion system 100 for co-extruding a multilayered article 150. Co-extrusion system 100 includes a first extruder 102 fluidly coupled to a die 104 via a first flow channel 106 and a second extruder 108 fluidly coupled to die 104 via a second flow channel 110. First extruder 102 and second extruder 108 are configured to flow a respective first material and second material through respective first flow channel 106 and second flow channel 110. For example, first extruder 102 and second extruder 108 may include a screw conveyer, plunger, or other mechanical components to drive the respective first material and second material through respective first flow channel 106 and second flow channel 110. In some examples, any one or more of first extruder 102, die 104, first flow channel 106 second extruder 108, or second flow channel 110 may include a temperature sensor configured to monitor a temperature the material within of the respective component of co-extrusion system 100, a pressure sensor configured to monitor a pressure of the material within the respective component of co-extrusion system 100, or both.

In some examples, first extruder 102, second extruder 108, or both include respective heating devices configured to heat a material within the respective extruder. Controlling a temperature of the material within first extruder 102, second extruder 108, or both may improve control of the rate of extrusion.

In some examples, first extruder 102, second extruder 108, or both include a respective pressure control device configured to regulate a pressure within the respective extruder and/or at a respective outlet of a respective extruder, e.g., first orifice 120 and/or second orifice 126 (discussed below). A pressure control device may be configured to reduce deadheading at a respective outlet of a respective extruder. The pressure control device may include, but is not limited to, one or more of a dump valve, a ball valve, a pressure actuated valve, a diverter valve, a gear pump, an accumulator head, an injection molding screw, or a device configured to control pressure of an extrudate and/or reduce deadheading at a respective outlet of a respective extruder. In some examples, a pressure control device may be fluidly coupled to a holding tank or a recirculation line configured to recycle material back into the respective extruder. In some examples, the pressure control device may include a control device configured to automatically operate the pressure control device. For example, the control device may automatically open and close a valve to maintain a desired pressure range in an extruder. By controlling a pressure of a respective extruder, co-extrusion system 100 may better control the flow of material from first extruder 102, second extruder 108, or both.

By forcing the first material and the second material through die 104 (and optionally heating the first and/or second material), first extruder 102 and second extruder 108 are configured to extrude the first material and second material from die 104 to form a length of co-extruded multilayer tube 150 extending along longitudinal axis 122. Co-extruded multilayer tube 150 may include an elongate tube having a continuous layer 152 of the first material and a plurality of periodically discontinuous layers 154 of the second material.

Continuous layer 152 defines an internal surface 153. Discontinuous layers 154 may be mechanically and/or chemically bonded to continuous layer 152 at interface 157. For example, interface 157 may include a region in which second material adheres to first material by mechanical bonding (e.g., via an adhesive or mechanical interlock formed by a selected shape of interface 157) and/or chemical bonding (e.g., electrostatic force between the first material and the second material at interface 157).

In some examples, at least one of the first material or the second material comprises a generally uniaxially aligned polymer. For example, by extruding the first material and the second material the polymers of co-extruded multilayer tube 150 may be substantially aligned with longitudinal axis. By comparison, an injection molded polymeric component may not have a generally uniaxially aligned polymer. In some examples, co-extruded multilayer tube 150 is free of subtractive manufacturing tool marks. Subtractive manufacturing tool marks may include ridges, valleys, or other surface imperfections introduced by machining material from an article. In some examples, co-extruded multilayer tube 150 is substantially free of parting lines. For example, parting lines may be formed on an article in a molding process where, for example, two halves of a mold meet to define the shape of the article. In some examples, co-extruded multilayer tube 150 is substantially free of gate marks. For example, gate marks may be formed on an article in a molding process where, for example, a polymeric material is injected into a mold that defines the shape of the article. In these ways, co-extruded multilayer tube 150 is distinguishable from a molded article, such as an injection molded article. Further, generally uniaxially aligned polymers without subtractive manufacturing tool marks, parting lines, and/or gate marks may have a reduced number of defects or flaws that negatively affect the performance of articles, such as, for example, control of an electrical field in a cable splice body application. In addition, the generally uniaxially aligned polymer may be subjected to processes such as drawing, tentering, folding or stretching that further modifies the orientation.

Each periodically discontinuous layer 154 includes a first terminal edge 155A and a second terminal edge 155B (collectively, "terminal edges 155"). Terminal edges 155 may include a selected longitudinal profile and axial profile (e.g., relative to longitudinal axis 122). For example, the longitudinal profile may include a taper extending in the longitudinal direction. The axial profile may include a thickness of the discontinuous layer.

The first material and the second material may include a curable polymeric material. In some examples, the first material includes an electrically insulative polymeric material. In some examples, the first material includes at least one of thermoplastic compounds, polyvinylchloride, polyethylene, thermosetting compounds, cross-linked polyethylene, ethylene propylene rubber, silicone rubber, ethylene propylene diene monomer (EPDM), or combinations thereof. In some examples, the second material includes at least one of a conductive material, a semiconductive material, an insulation material, or a high-K material. In some examples, the second material includes a conductive filler, such as carbon black, impregnated in a polymeric material, such as thermoplastic compounds, polyvinylchloride, polyethylene, thermosetting compounds, cross-linked polyethylene, ethylene propylene rubber, silicone rubber, ethylene propylene diene monomer (EPDM), or combinations thereof. Accordingly, the first and second materials can have differences in optical, physical, thermal, and electrical properties.

Die 104 includes an external die body 114 and an internal die body 116. External die body 114 includes a first distal surface 118 defining a first orifice 120 transverse to longitudinal axis 122. An outer diameter of the first orifice 120 may be selected based on a selected outer diameter of co-extruded multilayer tube 150. In some examples, the outer diameter of first orifice 120 may be within a range from about 3 millimeters (mm) to about 50 centimeters (cm), or from about 6.35 millimeters (mm) to about 15.24 centimeters (cm), such as about 2.54 cm to about 5.08 cm. First orifice 120 is fluidly coupled to first flow channel 106. In this way, first extruder 102 may extrude a first material out first orifice 120 of die 104.

Internal die body 116 includes a second distal surface 124 defining a second orifice 126. Second orifice 126 is positioned concentrically within first orifice 120. Second orifice 126 is fluidly coupled to second flow channel 110. In this way, second extruder 108 may extrude a second material out second orifice 126 of die 104. Internal die body 116 also includes an element, such as an inner pin 128. Inner pin 128 extends from a proximal end 130 to a distal end 132 along the longitudinal axis 122. Inner pin 128 is positioned concentrically within second orifice 126. In this way, first orifice 120, second orifice 126, and inner pin 128 define an annular region from which co-extruded multilayer tube 150 is extruded.

In some examples, inner pin 128 includes a proximal lip 134 and a die land 136. Proximal lip 134 extends transverse to the longitudinal axis 122 from an inner diameter less than the diameter of second orifice 126 to an outer diameter greater than a diameter of second orifice 126. In some examples, proximal lip may extend from the inner diameter to the outer diameter at an angle relative to the longitudinal axis, such as an angle within a range from about 90 degrees to about 15 degrees. Inner pin 128 is moveable between a first position configured to fluidly decouple second orifice 126 from first orifice 120 and a second position configured to fluidly couple second orifice 126 to first orifice 120. For example, inner pin 128 may be coupled to an actuator 129. In this way, inner pin 128 is configured to control the flow of the second material to enable co-extrusion system 100 to extrude a continuous layer of the first material and a periodically discontinuous layer of the second material.

Die land 136 extends distally from proximal lip 134 to a terminal edge at distal end 132 of inner pin 128. In some examples, die land 136 may be substantially parallel to longitudinal axis 122. In other examples, die land 136 may diverge from or converge toward longitudinal axis 122 at a selected angle. For example, die land 136 may extend along a plane that distally (or proximally) intersects longitudinal axis at an angle with in a range from about 1 degree to about 80 degrees, such as within a range from about 30 degrees to about 60 degrees. In some examples, die land 136 includes a length selected such that the extruded first material, second material, or both retain a selected shape. The length of die land 136 may be within a range from about 1.5 millimeters (mm) to about 150 mm (or more), or from about 1.5 mm to about 25.4 mm, such as about 3 mm to about 12.7 mm. In some examples, increasing the die land length may result in an increase in smearing of discontinuous layer. To reduce smearing, die land many include a low surface energy coating, as known in the art. In some examples, die land 136 may include a substantially straight segment and a tapered segment. For example, die land 136 may include a first segment extending substantially parallel to longitudinal axis 122 from proximal lip 134 about 3 mm in length and a second segment extending toward longitudinal axis at an angle between about 30 degree and about 60 degrees. In some examples, a first plane defined by distal end 132 may be about 6 mm to the left of a second plane defined by first distal surface 118 of external die body 114. A diameter of the terminal edge of die land 136 may correspond to an inner diameter of the extruded tube. In some examples, a diameter of the terminal edge of die land 136 may be within a range from about 2 mm to about 200 mm, or from about 2.54 mm to about 101.6 mm, such as about 9 mm to about 31 mm or about 12.7 mm to about 25.4 mm. In some examples, dimensions of inner pin 128 may be selected to reduce smearing of discontinuous layer 154, control an edge profile of discontinuous layer 154, and/or improve bonding of discontinuous layer 154 to continuous layer 152.

In some examples, co-extrusion system 100 includes computing device 112 coupled to first extruder 102, second extruder 108, and die 104. Computing device 112 is configured to control the extrusion process. For example, computing device 112 may include one or more processors 113, one or more memory storage devices 115, and a communication interface 117. One or more storage devices 115 may include a non-transitory computer readable storage medium including instructions that when executed cause one or more processors 113 to control co-extrusion system 100 to extrude co-extruded multilayer tube 150. One or more processors 113 may be communicatively coupled via communication interface 117 to first extruder 102, second extruder 108, and die 104 and configured to control, for example, a feed rate of the first material and the second material from respective first extruder 102 and second extruder 108, an operating temperature of first extruder 102 and/or second extruder 108, and a position of inner pin 128. In some examples, communication interface 117 may include a user interface configured to output visual, audio, or sematic information to an operator and/or receive from the operator one or more commands to control an operation of any one or more of first extruder 102, second extruder 108, and die 104.

Although not illustrated in FIG. 1, in some examples, co-extrusion system 100 may include a post-extrusion heater, a post-extrusion cooling bath, post-extrusion cutting, or combinations thereof. For example, following extrusion of co-extruded multilayer tube 150, a tubular heater, such as a radiant heater, may heat co-extruded multilayer tube 150. Heating co-extruded multilayer tube 150 may contribute to the development, upon cure, of a strong bond between the continuous layer 152 and discontinuous layer 154. In some examples, following extrusion of co-extruded multilayer tube 150 or following the heating of co-extruded multilayer tube 150, co-extruded multilayer tube 150 may be immersed in a cooling bath. In some examples, following extrusion, heating, or cooling of co-extruded multilayer tube 150, co-extruded multilayer tube 150 may be cut to selected lengths. In some examples, after cutting co-extruded multilayer tube 150, individual pieces may be heated under pressure, e.g., in an autoclave, to cure the curable elastomer.

Figure 2:
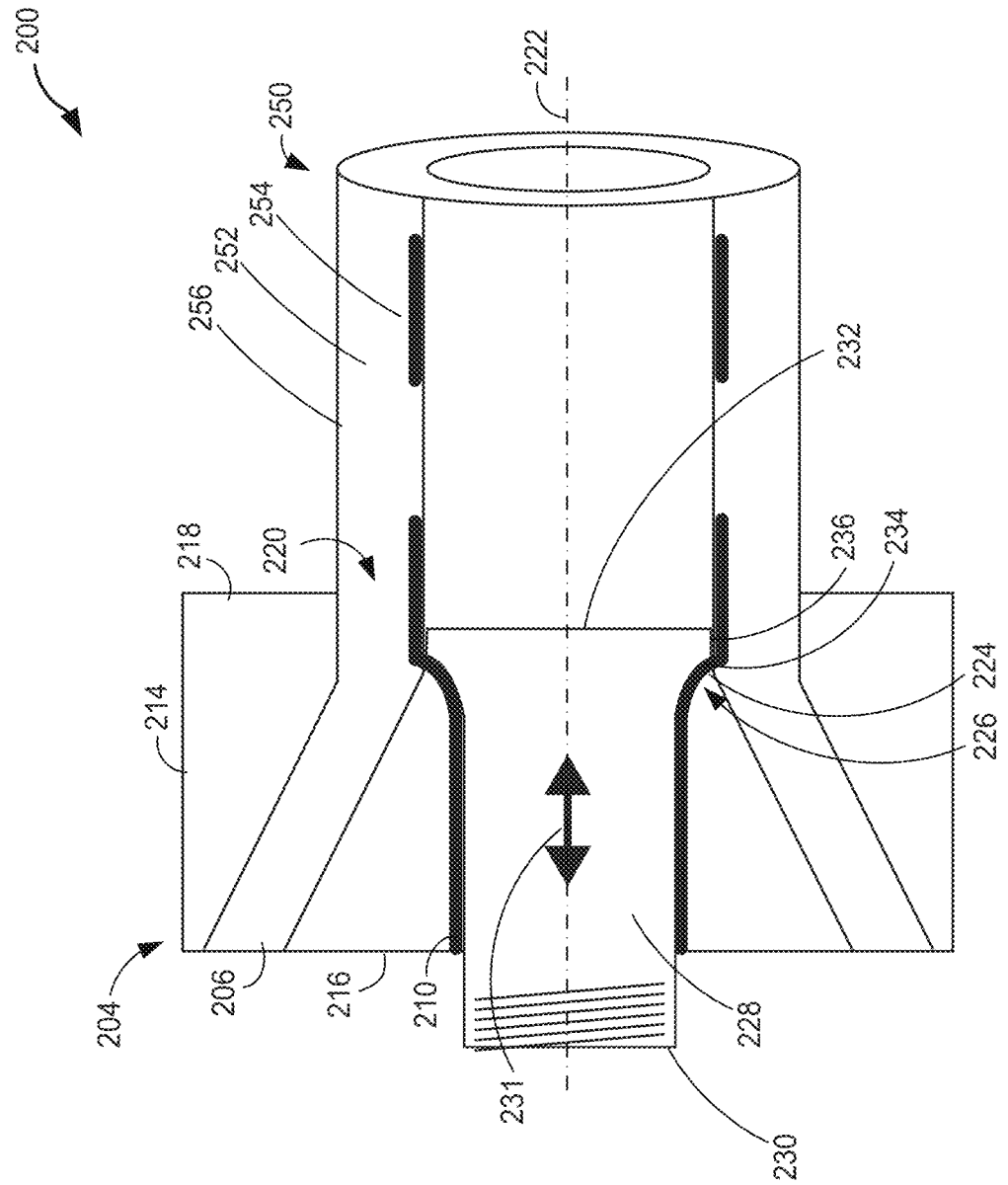
FIG. 2 is a conceptual diagram illustrating a portion of a co-extrusion system that includes a die having a moveable inner pin.

FIG. 2 is a conceptual diagram illustrating a portion of co-extrusion system 200 that includes a die 204 having a movable element, such as inner pin 228. Co-extrusion system 200 may be the same or substantially similar to co-extrusion system 100 described above in reference to FIG. 1, except for the differences described herein. For example, co-extrusion system 200 is configured to extrude a first material and a second material from die 204 to form a length of co-extruded multilayer tube 250 extending along longitudinal axis 222. Co-extruded multilayer tube 250 includes a first continuous layer 252, a periodically discontinuous layer 254, and a second continuous layer 256. In some examples, co-extruded multilayer tube 250 may include a single continuous layer as describe above in reference to FIG. 1. Die 204 includes an external die body 214 and internal die body 216. External die body 214 defines a first distal surface 218 and first orifice 220 transverse to longitudinal axis 222 and fluidly coupled to a first flow channel 206. As illustrated in FIG. 2, co-extrusion system 200 is configured to extrude a first material and a third material from first orifice 220 to form respective first continuous layer 252 and second continuous layer 256.

Internal die body 216 defines a second distal surface 224 and second orifice 226. Internal die body 216 includes an element, such as inner pin 228. Inner pin 228 extends from a proximal end 230 to a distal end 232 along the longitudinal axis 222. Inner pin 228 is configured to slide along longitudinal axis 222 in the proximal-distal direction, as indicated by arrow 231. In a proximal-most position (e.g., first position), proximal lip 234 is configured to seal second orifice 226 from first orifice 220 by engaging with at least a portion of second distal surface 224 of internal die body 216. In a distal-most position (e.g., second position), as illustrated in FIG. 2, proximal lip 234 is moved distal to second distal surface 224 to open second orifice 226 to first orifice 220. In this way, inner pin 228 is configured to control the flow of a second material from die 204.

Figure 3C:
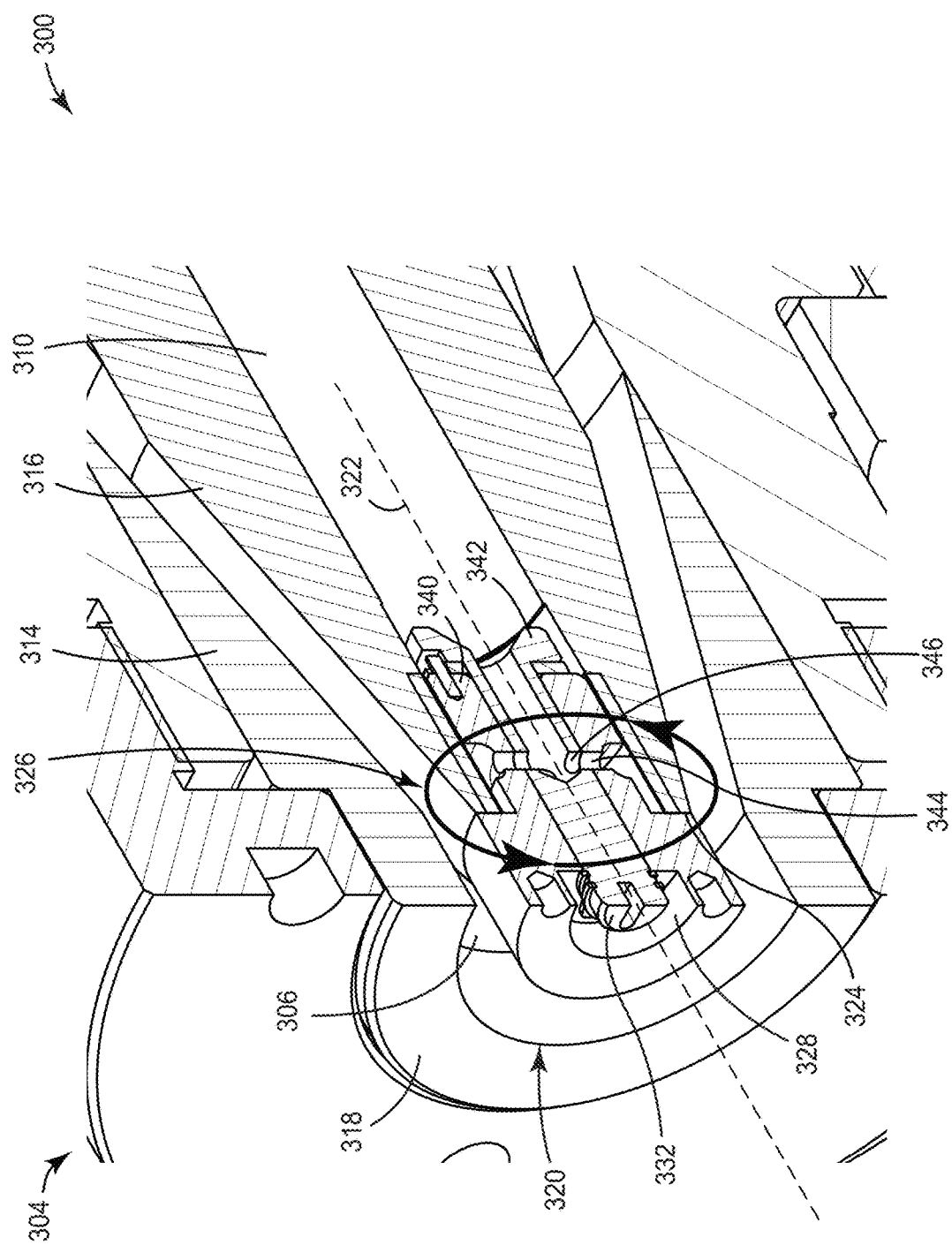

Although illustrated in reference to FIGS. 1 and 2 as moving axially, in some example, an inner pin of a co-extrusion system may control the flow of second material from die by other means, such as a rotary valve. FIGS. 3A-3C are conceptual diagrams illustrating a die 304 of an example co-extrusion system 300 including an inner pin 328 operable in a rotary configuration. Co-extrusion system 300 may be the same or substantially similar to co-extrusion systems 100 and 200 described above in reference to respective FIGS. 1 and 2, except for the differences described herein. Die 304 includes an external die body 314 and internal die body 316. External die body 314 defines a first distal surface 318 and first orifice 320 transverse to longitudinal axis 322 and fluidly coupled to a first flow channel (not shown). Internal die body 316 defines a second distal surface (not shown) and second orifice 326. Internal die body 316 includes inner pin 328.

Inner pin 328 includes a stationary member 340 and a rotating member 342. Stationary member 340 defines a third orifice 344 fluidly coupled to second orifice 326. Rotating member 342 defines fourth orifice 346 fluidly coupled to second flow channel 310. Rotating member 342 is rotatable about the longitudinal axis in a radial direction, as indicated by arrow 331. Rotating member 342 is controllable between a first position where third orifice 344 is fluidly coupled to fourth orifice 346, as illustrated in FIG. 3C, and second position where third orifice 344 is not fluidly coupled to fourth orifice 346.

Figure 4A:
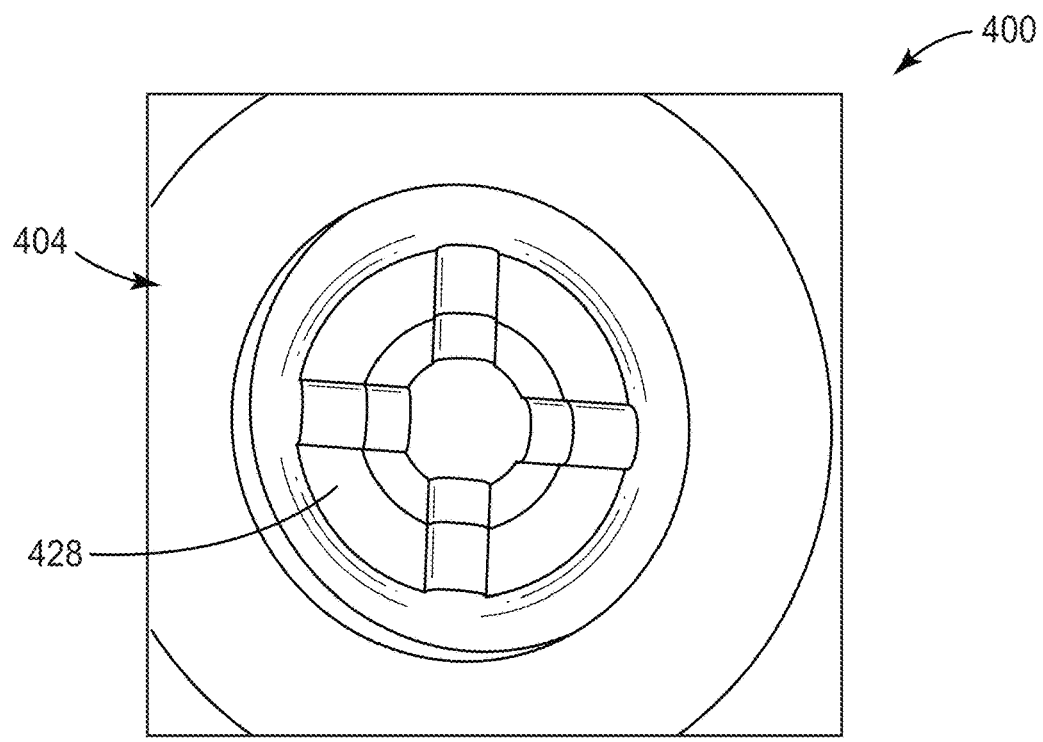
FIGS. 4A and 4B are conceptual diagrams illustrating an example die having rotary actuated inner pin.
Figure 4B:
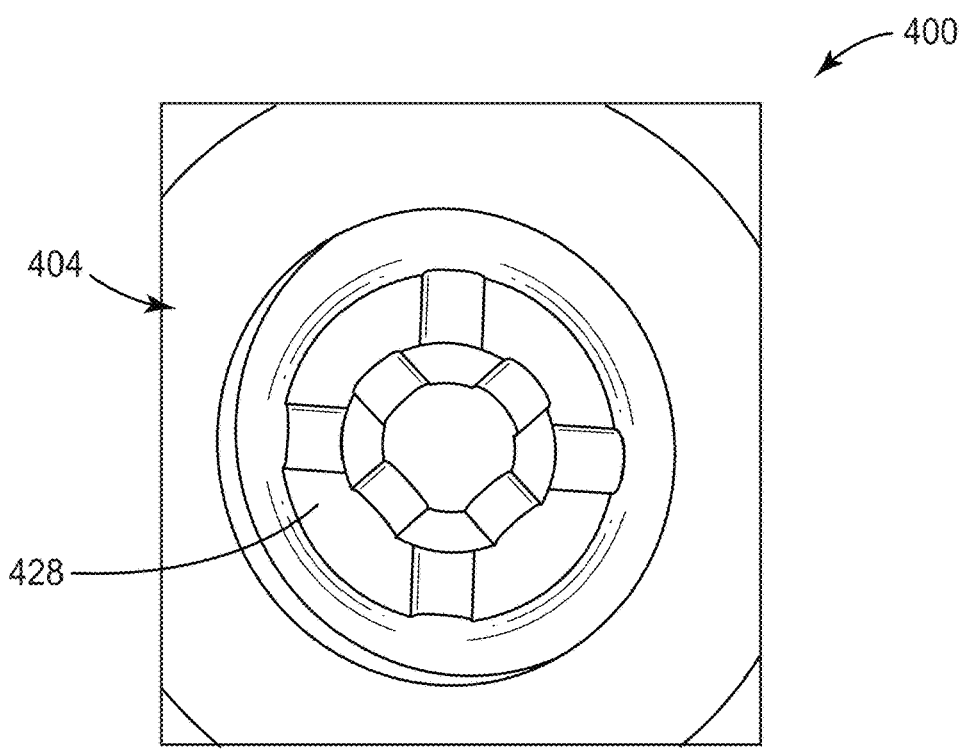

Although illustrated in FIGS. 3A-3C as a crosshead die body, in some examples, a rotary actuated inner pin may include other rotary actuated inner pins. FIGS. 4A and 4B are conceptual diagrams illustrating an example die 404 having rotary actuated inner pin 428. FIG. 4A illustrates inner pin 428 in an open configuration (e.g., second position). FIG. 4B illustrates inner pin 428 in a closed configuration (e.g., first position).

Figure 5:
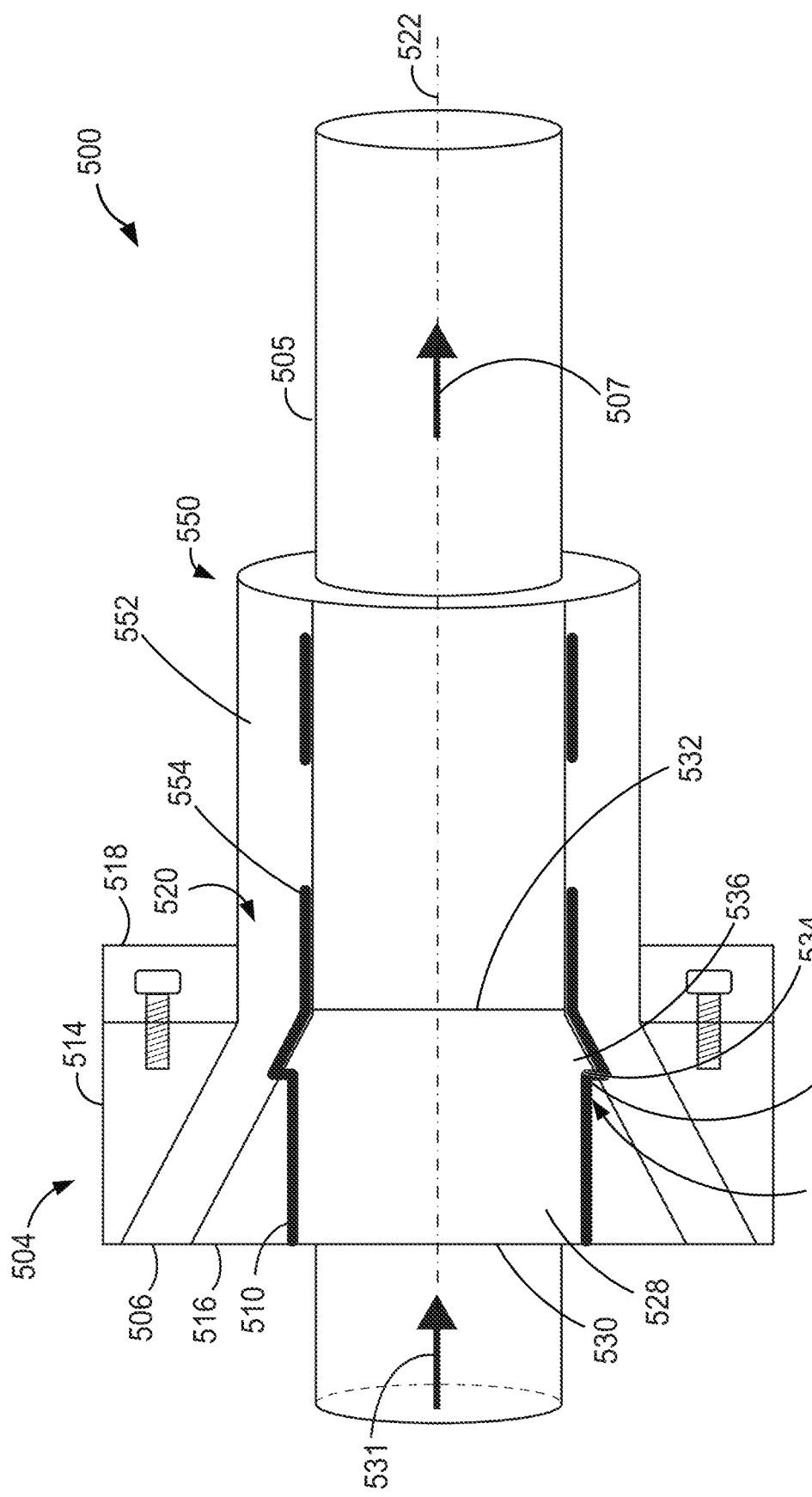
FIG. 5 is a conceptual diagram illustrating an example die of a co-extrusion system using a mandrel.

In some examples, a co-extrusion system may use a mandrel to facilitate formation of the co-extruded multilayer article. FIG. 5 is a conceptual diagram illustrating an example die 504 of a co-extrusion system 500 using a mandrel 505. Co-extrusion system 500 may be the same or substantially similar to co-extrusion systems 100, 200, 300, and 400 described above in reference to FIGS. 1-4B, except for the differences described herein. For example, co-extrusion system 500 is configured to extrude a first material and a second material from die 504 to form a length of co-extruded multilayer tube 550 extending along longitudinal axis 522. Co-extruded multilayer tube 550 includes a continuous layer 552 and a periodically discontinuous layer 554. Die 504 includes an external die body 514 and internal die body 516. External die body 514 defines a first distal surface 518 and first orifice 520 transverse to longitudinal axis 522 and fluidly coupled to a first flow channel 506.

Internal die body 516 defines a second distal surface 524 and second orifice 526. Internal die body 516 includes an element, such as inner pin 528. Inner pin 528 extends from a proximal end 530 to a distal end 532 along the longitudinal axis 522. Inner pin 528 is configured to slide along longitudinal axis 522 in the proximal-distal direction, as indicated by arrow 531. In a proximal-most position (e.g., first position), proximal lip 534 is configured to seal second orifice 526 from first orifice 520 by engaging with at least a portion of second distal surface 524 of internal die body 516. In a distal-most position (e.g., second position), as illustrated in FIG. 5, proximal lip 534 is moved distal to second distal surface 524 to open second orifice 526 to first orifice 520. In this way, inner pin 528 is configured to control the flow of second material from die 504.

Co-extrusion system 500 includes mandrel 505 extending through inner pin 528 of die 504. In operation, as co-extrusion system 500 extrudes co-extruded multilayer tube 550, mandrel 505 travels in the direction indicated by arrow 507 at the same rate as co-extruded multilayer tube 550 is extruded. Mandrel 505 may facilitate curing of co-extruded multilayer tube 550 by maintaining a shape of an inner surface of co-extruded multilayer tube 550. In some examples, mandrel 505 may include a coating configured to facilitate removal of mandrel 505 from co-extruded multilayer tube 550 after co-extruded multilayer tube 550 has cured. In some examples, mandrel 505 may facilitate curing of co-extruded multilayer tube 550 by controlling a cooling rate of co-extruded multilayer tube 550. For example, mandrel 505 may increase a cooling rate of the inner surface of co-extruded multilayer tube 550 or reduce the cooling rate of co-extruded multilayer tube 550 by retaining heat longer than co-extruded multilayer tube 550 without mandrel 505.

Figure 6:
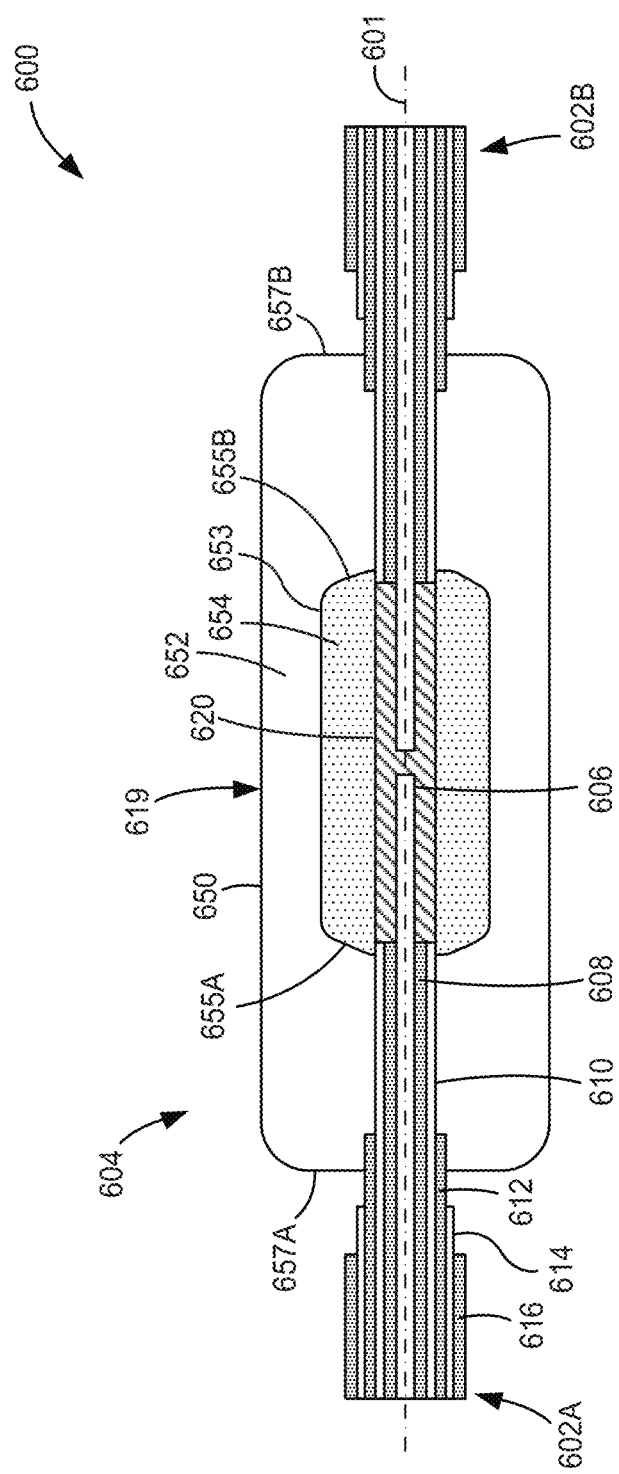
FIG. 6 is a conceptual diagram illustrating an example portion of an insulated power cable including electrical cables and an electrical cable splice that includes a co-extruded multilayer splice body.

FIG. 6 is a conceptual diagram illustrating an example portion of an insulated power cable 600 including electrical cables 602A and 602B (collectively, "cables 602") and electrical cable splice 604 ("splice 604") that includes a co-extruded multilayer splice body 619. Insulated power cable 600 may be configured to transmit electricity of any suitable selected voltage and/or frequency underground, underwater, or suspended overhead. For example, insulated power cable 600 may transmit voltages of 11 kV, 33 kV, 66 kV, or 360 kV. In some examples, insulated power cable 600 is configured to transmit "medium voltages" within a voltage range between about 12 kV and about 45 kV, e.g., insulated power cable 600 may include a medium voltage electrical cable. In some examples, insulated power cable 600 transmits electrical power between a power source and substation may transmit voltages of 360 kV or more, which may be considered a "transmission level voltage." In some examples, insulated power cable 600 transmits voltages between 33 kV and 360 kV, which may be considered "subtransmission-level voltages," and may provide electrical power from a power source to an end-user or customer (e.g., customers utilizing a relatively large amount of power). In some examples, insulated power cable 600 that transmit electrical power between a distribution substation and a distribution transformer may transmit voltages less than 33 kV, which may be considered "distribution-level voltages." In some examples, insulated power cable 600 transmits electrical power between a distribution substation or distribution transformer (e.g., a pad-mount transformer or pole-mount transformer) and end-users or consumers (e.g., homes and businesses) and may transmit voltages between 360 volts and 240 volts, at such voltages insulated power cable 600 may be called "secondary distribution lines."

Electrical cables 602 include shielded electrical cables having a plurality of concentric (e.g., cylindrical) layers. In some examples, electrical cables 602 include a central conductor 606, conductor screen 608, insulation 610, insulation screen 612, shield 614 (e.g., "metallic shield"), and jacket 616. In some examples, electrical cables 602 may include different layers, fewer layers, or additional layers.

Central conductor 606 may include a conductive material, such as copper or aluminum. In some examples, central conductor 606 includes a single solid conductor or a plurality of stranded conductors. A diameter (e.g., cross-sectional area) of the central conductor 606 may be based on the current that electrical cables 602 are designed to transmit. For example, a diameter of central conductor 606 may be selected to transmit currents of at least about 15 amperes (A), such as at least about 120 A, such as at least about 1,000 A.

Conductor screen 608 may include a semi-conductive polymer, such as carbon black loaded polymer. The semi-conductive polymer may have a bulk resistivity in a range from about 5 ohm-cm to about 100 ohm-cm. In some examples, conductor screen 608 is physically and electrically coupled to central conductor 606. For example, conductor screen 608 may be disposed between central conductor 606 and insulation 610. Conductor screen 608 may provide a continuous conductive surface around the exterior of central conductor 606, which may reduce partial discharge that might otherwise be created by central conductor 606.

Insulation 610 includes polyethylene, such as a cross-linked polyethylene (which may be abbreviated as PEX, XPE, or XLPE) or an ethylene propylene rubber (EPR). A diameter or thickness of the insulation 610 may be based on the voltage that electrical cables 602 is designed to transmit.

Insulation screen 612 may include a semi-conductive polymer similar to conductor screen 608. Insulation screen 612 is disposed between insulation 610 and shield 614. Insulation screen 612 may be coupled to insulation 610. In some examples, insulation screen 612 is electrically coupled to shield 614.

Shield 614 may include a conductive material, such as a metal foil, film, or wires. In some examples, shield 614 may be referred to as a "earth ground conductor."

Jacket 616 is an outer layer of electrical cables 602 including a plastic or rubber polymer, such as polyvinyl chloride (PVC), polyethylene (PE), or ethylene propylene diene monomer (EPDM). In some examples, jacket 616 may include an oversheath configured to support and protect the other layers of electrical cables 602.

In some examples, electrical cables 602 may include additional layers, such as a swellable or water blocking material placed within the conductor strands (e.g., a strand fill) or between various layers within electrical cables 602.

Splice 604 is configured to electrically and physically couple electrical cable 602A to electrical cable 602B. In some examples, rather than a splice 604, insulated power cable 600 may include a termination configured to electrically and physically couple an electrical cable (e.g., electrical cable 602A) to electrical equipment, such as a transformer, switch gear, power substation, business, home, or other structure. In some examples, insulated power cable 600 may include other cable accessories.

As illustrated in FIG. 6, splice 604 may include a splice body 619 and a connector 620. Connector 620 includes a cylindrical body having an outer surface extending from a first terminal edge to a second terminal edge opposite the first terminal edge. Each end of the cylindrical body may be configured to receive a respective electrical cable of electrical cables 602. For example, the first terminal edge and the second terminal edge of connector 620 may each include an aperture configured to receive central conductor 606 of electrical cables 602. The apertures may extend the entire length of connector 620, such that connector 620 includes a single aperture or hollow region traversing from the first terminal edge of connector 620 to the surface of the second terminal edge of connector 620. Connector 620 includes a conductive material, such as steel, copper, or aluminum. A diameter or thickness of the connector 620 may be based on the current that insulated power cable 600 is designed to transmit or conduct and/or the gauge of electrical cables 602 that splice 604 is configured to connect. In some examples, connector 620 may couple more than two electrical cables 602. An installer coupling two electrical cables together may insert a central conductor of a first electrical cable (e.g., electrical cable 602A) into the aperture at a first terminal edge of connector 620 and a central conductor of a second electrical cable (e.g., electrical cable 602B) into the aperture at a second terminal edge of connector 620 and crimp connector 620 to electrically couple electrical cables 602.

Splice body 619 includes a co-extruded multilayer article 650. Co-extruded multilayer article 650 extends along longitudinal axis 601 and includes a continuous layer 652 and a discontinuous layer 654. Continuous layer 652 extends along the entire length of splice body 619, e.g., from first terminal edge 657A to second terminal edge 657B. The length of splice body 619 may be selected to enable continuous layer 652 to overlap at least a portion of insulation screen 612.

Discontinuous layer 654 extends from a first terminal edge 655A to a second terminal edge 655B. In some examples, discontinuous layer 654 may be mechanically and/or chemically bonded to interior surface 653 of continuous layer 652. For example, during a co-extrusion of -extruded multilayer article 650, a polymeric material of discontinuous layer 654 may mechanically and/or chemically bond to at least a portion of a polymeric material of continuous layer 652. In addition, in some embodiments, the exposed surfaces of layers 652 and 654 may be substantially planar or co-planar as extruded, with layer 564 either formed on, embedded or partially embedded in layer 652. Moreover, in other embodiments, the leading and/or trailing edge of the discontinuous layer 654 may have a substantially circular, elliptical, or wave-type shape or pattern when viewed as a cross section of the formed article (e.g., a tube or film).

The length of discontinuous layer 654 may be selected to overlap selected layers of electrical cables 602. For example, as illustrated in FIG. 6, discontinuous layer 654 may overlap conductor 620 and a portion of conductor screen 608. The overlapped layers and amount of overlap may be configured to provide selected mechanical and/or electrical properties to splice 604. For example, as discussed above in reference to FIG. 1, discontinuous layer 654 may include a conductive material or a semi-conductive material that when in contact with connector 620, central conductor 606, and/or conductor screen 608, may improve transmission of current from first electrical cable 602A to second electrical cable 602B.

Terminal edges 655A and 655B of the discontinuous layer are transverse to the longitudinal axis of splice 604. In some examples, terminal edges 655A and 655B include discrete, smooth edge profiles in the longitudinal direction. In some examples, terminal edges 655A and 655B include substantially uniform thickness in the axis direction. In some examples, the longitudinal profile and/or axial profile of terminal edges 655A and 655B may include a shaped profile. For example, as illustrated in FIG. 6, terminal edges 655A and 655B include a tapered and rounded profile. In operation, the longitudinal profile and/or axial profile may reduce concentration of electrical stress, reduce partial discharge events, or both. For example, terminal edges 655A and 655B may be substantially free of smearing, trailing, flashing or other distortions that could otherwise create unwanted electrical fields, which may cause concentration of electrical stress that can result in partial discharge events or other failure modes. In this way, co-extruded multilayer article 650 may reduce partial discharge events or other failure modes and increase the usable life of splice 604.

In some examples, discontinuous layer 654 may include a high-K material configured to at least partially electrically insulate other layers of splice 604 (e.g., continuous layer 652) from connector 620, central conductor 606, and/or conductor screen 608. In this way, discontinuous layer 654 may be configured to electrically couple respective layers of electrical cables 602 to each other or portions of splice 604, electrically insulate respective layers of electrical cables 602 to each other or portions of splice 604, or both.

In some examples, splice 604 may include additional layers external to continuous layer 652, such as, for example, a ground conductor configured to electrically couple shield 614 of electrical cables 602 and/or a protective jacket configured to overlap jacket 616 of cables 602 to support and protect splice body 619 from mechanical or environmental degradation.

Although illustrated as including one continuous layer and one discontinuous layer, splice 604 may include a plurality of continuous layers and a plurality of discontinuous layers. The plurality of discontinuous layers may be adjacent or separated by one or more continuous layers. The plurality of continuous layers may be adjacent or at least partially separated by one or more discontinuous layers. Each layer may be configured to provide selected mechanical properties and/or electrical properties.

Figure 7:
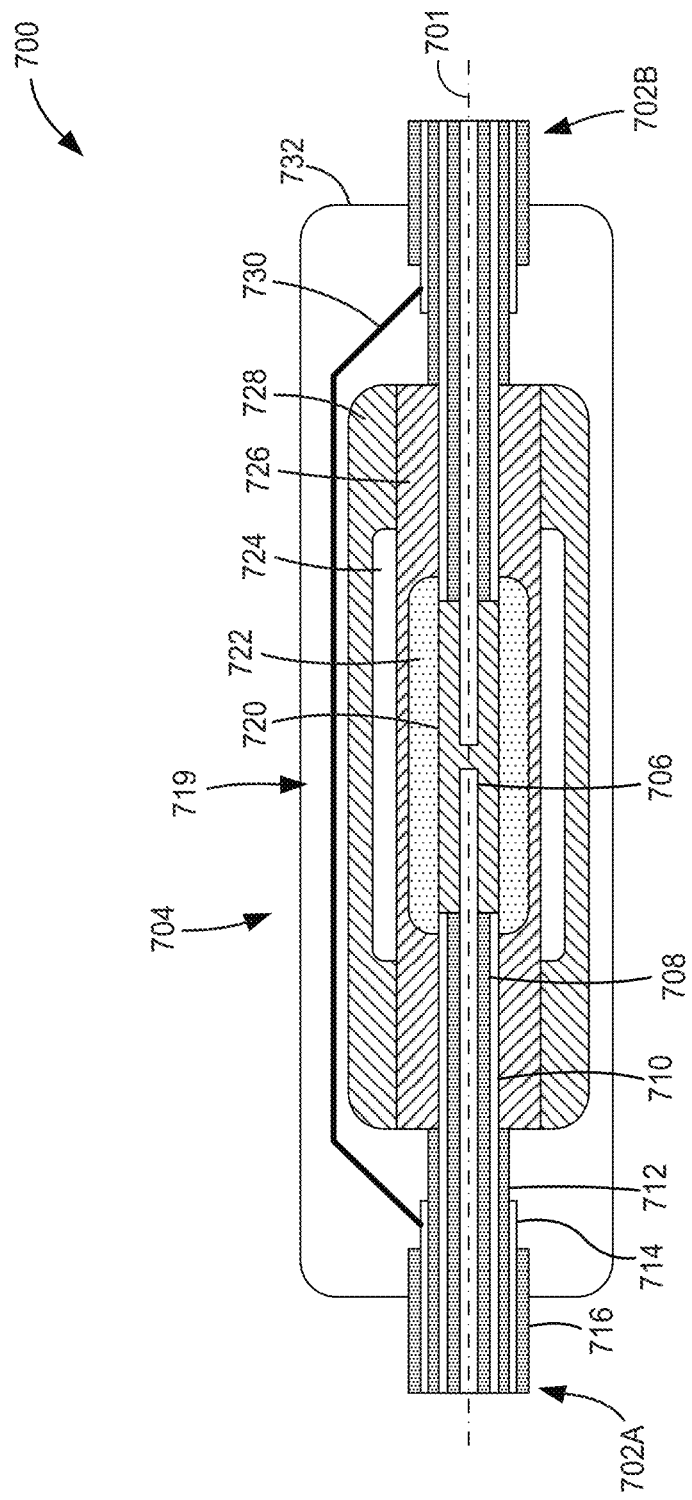
FIG. 7 is a conceptual diagram illustrating an example portion of an insulated power cable including electrical cables and an electrical cable splice that includes a co-extruded multilayer splice body.

FIG. 7 is a conceptual diagram illustrating an example portion of an insulated power cable 700 including electrical cables 702A and 702B (collectively, "cables 702") and electrical cable splice 704 ("splice 704") that includes a co-extruded multilayer splice body 719. Insulated power cable 700 may be the same as or substantially similar to insulated power cable 600 discussed above in reference to FIG. 6, except for the differences described herein. For example, electrical cables 702 may include a central conductor 706, conductor screen 708, insulation 710, insulation screen 712, shield 714, and jacket 716.

Co-extruded multilayer splice body 719 includes a plurality of discontinuous layers and a plurality of continuous layers. The plurality of discontinuous layers includes a first discontinuous layer 722 and a second discontinuous layer 724, and the plurality of continuous layers includes a first continuous layer 726 and a second continuous layer 728. Splice 704, or at least two or more layers of splice 704, may be formed by co-extrusion. Forming two or more layers of splice 704 using co-extrusion may reduce defects, such as misalignment of layers or voids in layers or between layers and/or improve control of a longitudinal profile and/or axial profile of layers. For example, the terminal edges of the discontinuous layer may be substantially free of smearing, trailing, flashing or other distortions. Reduction in defects and improved control of terminal edge profile of layers may improve function of splice 704 by, for example, reducing concentration of electrical stress, reduce partial discharge events, or both.

First discontinuous layer 722 may include a semiconductive material, such as a carbon filled polymer. Second discontinuous layer 724 may include a conductive layer.

First continuous layer 726 may include a high-K material, an insulating material, or relatively high resistance material that is not a perfect insulator. In some examples, first continuous layer 726 is configured to electrically isolate first discontinuous layer 722 and/or second discontinuous layer 724 from one or more other layers of splice 704.

Second continuous layer 728 may include an insulating material, such as an elastomeric rubber (e.g., ethylene propylene diene monomer (EPDM)). By including second discontinuous layer 724, splice body 719 may better control an electric field compared to a splice body without a second discontinuous layer 724. For example, when electrical current flows through insulated power cable 700, second discontinuous layer 724 may cause the electrical field to develop more parallel to longitudinal axis 701 compared to an insulated power cable without a second discontinuous layer, which may result in an electrical field substantially normal to longitudinal axis 701.

In some examples, splice 704 may include a ground conductor 730 configured to electrically couple shield 714 of electrical cables 702. Ground conductor 730 may include a conductive material, such as a metal wire mesh, copper, or aluminum. In some examples, splice body 719 may include a third continuous layer (not shown) between connector 720 and first discontinuous layer 722, such that first discontinuous layer 722 may electrically float relative to connector 720 or ground conductor 730. In other words, in some examples, first discontinuous layer 722 may be electrically isolated from, and have a different potential than, connector 720 and ground conductor 730. For example, when connector 720 conducts AC current, an oscillating AC voltage in connector 720 may generate a magnetic field, which may in turn induce an AC current and voltage in first discontinuous layer 722.

In some examples, splice 704 may include a jacket 732 configured to overlap jacket 716 of cables 702 to support and protect splice body 719 from mechanical or environmental degradation. For example, jacket 732 may include one or more thermoset plastics, thermoplastics, particulate loaded nylon, acrylonitrile butadiene styrene, polyethylene, polypropylene, ethylene propylene diene monomer rubber, ethylene propylene rubber, polyvinyl chloride, or other materials configured to support, house, and protect splice 704, and/or electrical cables 702. In some examples, jacket 732 may include an interior surface, such as an elastomer, configured to create a friction fit, e.g., interference fit, between jacket 732 and one or more layers of electrical cables 702. By supporting electrical cables 702, jacket 730 may reduce wear, such as wear on connector 720, cause by the relative motion of electrical cables 702.

Figure 8:
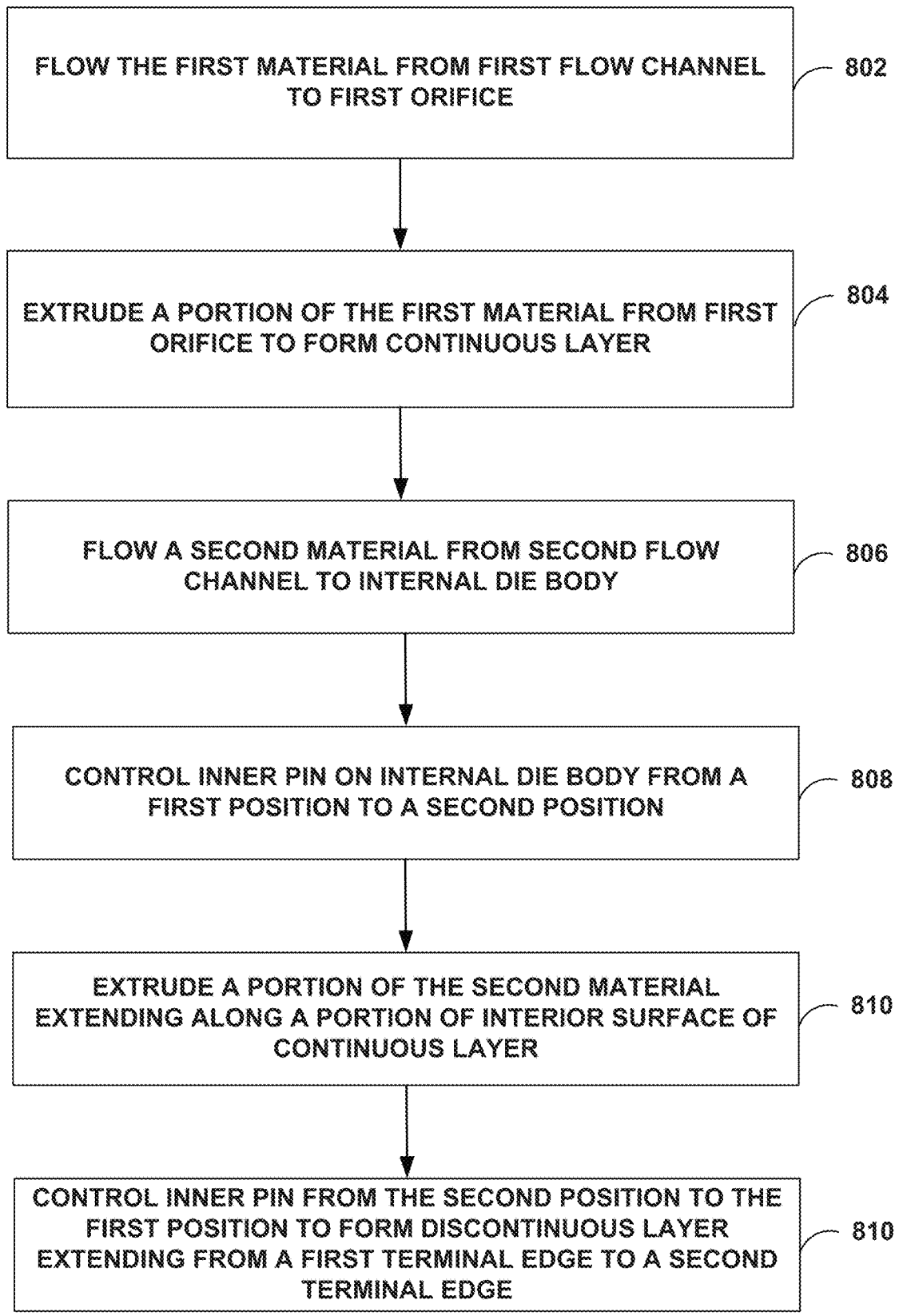
FIG. 8 is a flow diagram illustrating an example technique for manufacturing a co-extruded multilayer article.

The above described electrical cable accessories may be manufactured using any suitable technique. FIG. 8 is a flow diagram illustrating an example technique for manufacturing a co-extruded multilayer article. Although the technique illustrated in FIG. 8 is described in reference to co-extrusion system 100 and co-extruded multilayer tube 150, the technique may use other systems and/or be used to manufacture other co-extruded multilayer articles, such as splice 704.

In some examples, although not shown in FIG. 8, the technique may include determining a circumference and/or diameter of electrical cable 702, splice 704, or both. Determining the circumference and/or diameter of electrical cable 702, splice 704, or both may enable selection of a diameter of extrusion die 104 used to extrude co-extruded multilayer tube 150.

The technique illustrated in FIG. 8 includes flowing a first material from first flow channel 106 of external die body 114, which includes first distal surface 118 defining first orifice 120 transverse to longitudinal axis 122, to first orifice 120 (802). The technique illustrated in FIG. 8 also includes extruding a portion of the first material from first orifice 120 to form continuous layer 152 extending along longitudinal axis 122 and defining interior surface 153 concentric to longitudinal axis 122 (804). In some examples, extruding the first material may include controlling a temperature of the first material or a pressure of the first material. For example, the temperature and/or pressure of the first material may be measured within first extruder 102, first flow channel 106, or die 104. Measuring the temperature, volumetric rate (e.g., screw rpm) and/or pressure of the first material may enable controlling the speed of extrusion of the first material. For example, the speed of extrusion may be proportional to the temperature of the first material, e.g., via viscosity of the first material, and/or proportional to the pressure of the first material. In some examples, extruding the first material may include measuring a rate of extrusion of the first material by, for example, an optical or infrared camera. In this way, the technique may include controlling the speed of extrusion of the first material by controlling the temperature of the first material, pressure of the first material, or both.

The technique illustrated in FIG. 8 includes flowing a second material from second flow channel 110 to an internal die body (806). As discussed above in reference to FIG. 1, second distal surface 124 defines second orifice 126 positioned concentrically within first orifice 120 and fluidly coupled to second flow channel 110. Second flow channel 110 is fluidly coupled to second extruder 108. Inner pin 128 is positioned concentrically within second orifice 126 and extends along longitudinal axis 122 from proximal end 130 to distal end 132 having proximal lip 134 extending transverse to longitudinal axis 122 from an inner diameter less than the diameter of second orifice 126 to an outer diameter greater than a diameter of second orifice 126 and die land 136 extending distally from proximal lip 134 to a terminal edge. As discussed above in reference to extruding the first material, the technique may include measuring and/or controlling the temperature and/or pressure of the second material to control a rate of extrusion of the second material.

The technique illustrated in FIG. 8 includes controlling inner pin 128 from a first position to a second position (808).

In the first position, second orifice 126 is fluidly decoupled from first orifice 120. In the first position, the second material may not be extruded from die 104. In the second position, second orifice 126 is fluidly coupled to first orifice 120. In the second position, the second material may be allowed to extrude from die 104. In some examples, the technique includes controlling a speed of movement of inner pin 128 from the first position to the second position. By controlling the speed of movement of inner pin 128, co-extruder system 100 may be configured to control a terminal edge profile of discontinuous layer 154. For example, a speed of movement of inner pin 128 may be controlled relative to a rate of extrusion of the first material (e.g., continuous layer 152) to produce a selected edge profile, such as a rectilinear or rounded taper or a discrete edge. In some examples, both the speed of movement of inner pin 128 and rate of extrusion of the first material may be controlled to produce a selected terminal edge profile. For example, a rate of extrusion of the first material may be reduced or increased when inner pin 128 is moved from the first position to the second position.

The technique illustrated in FIG. 8 includes extruding a portion of the second material extending along a portion of interior surface 153 of continuous layer 152 (810). In some examples, the technique may include measuring and/or controlling a temperature of the second material and/or a pressure of the second material to control a rate of extrusion of the second material, similar to control of the rate of extrusion of the first material as discussed above. Controlling the rate of extrusion of the second material relative to a rate of extrusion of the first material may enable control of the axial profile of discontinuous layer 154. For example, a substantially similar rate of extrusion of the first material and second material may result in a substantially uniform thickness (in the axial direction) of the discontinuous layer. In some examples, a dissimilar rate of extrusion of the first material and second material may result in a nonuniform thickness of the discontinuous layer. For example, the rate of extrusion of the first material and rate of extrusion of the second material may be controlled to produce a convex or concave cross-sectional profile of the discontinuous layer (e.g., relative to longitudinal axis 122). By controlling the axial profile of discontinuous layer 154, co-extrusion system 100 may be configured to produce an electrical cable splice (e.g., splice 704) having a selected electrical stress concentration or distribution.

The technique illustrated in FIG. 8 includes controlling inner pin 128 from the second position to the first position to form discontinuous layer 154 from a first terminal edge 155A to a second terminal edge 155B (812). Similar to the above discussion, controlling inner pin 128 for the second position to the first position may include controlling a speed of movement of inner pin 128, a rate of extrusion of first material, and/or a rate of extrusion of second material, each independently or relative to one or more of each other to control a profile of the second terminal edge 155B of discontinuous layer 154.

In some examples, the technique may include post-extrusion processing. For example, the technique may include heating, by a tubular heater, such as a radiant heater, co-extruded multilayer tube 150. Heating co-extruded multilayer tube 150 may contribute to the development, upon cure, of a strong bond between the continuous layer 152 and discontinuous layer 154. In some examples, following extrusion of co-extruded multilayer tube 150 or following the heating of co-extruded multilayer tube 150, the technique may include cooling, by immersion in a cooling bath, co-extruded multilayer tube 150. In some examples, following extrusion, heating, or cooling of co-extruded multilayer tube 150, the technique may include cutting co-extruded multilayer tube 150 to selected lengths. In some examples, after cutting co-extruded multilayer tube 150, the technique may include heating under pressure, by, e.g., an autoclave, salt bath, or other conventional curing technique, individual pieces to cure the curable polymer. In some examples, after cutting co-extruded multilayer tube 150 or heating individual pieces, the technique may include material removal (e.g., grinding or cutting portions of material) or material addition (e.g., application of coatings, injection molding, or the like).

Figure 9A:
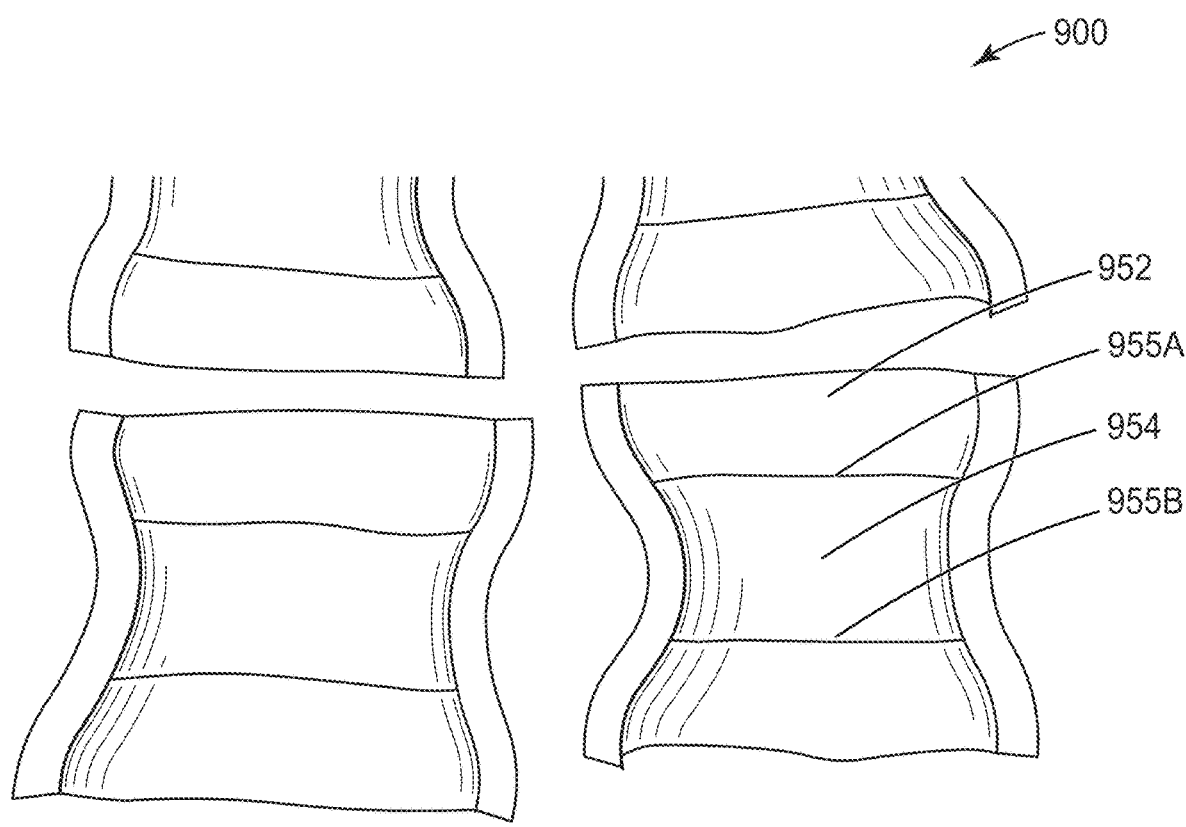
FIGS. 9A, 9B, 9C, 10, and 11 are photographs illustrating different example electrical cable splice bodies including co-extruded multilayers including a continuous layer and a discontinuous layer.
Figure 9B:
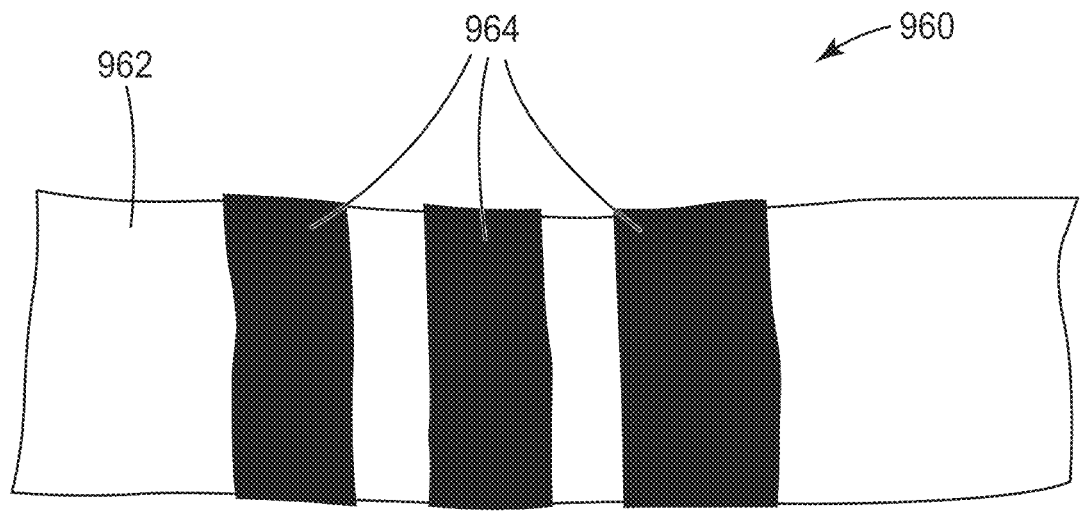
Figure 9C:
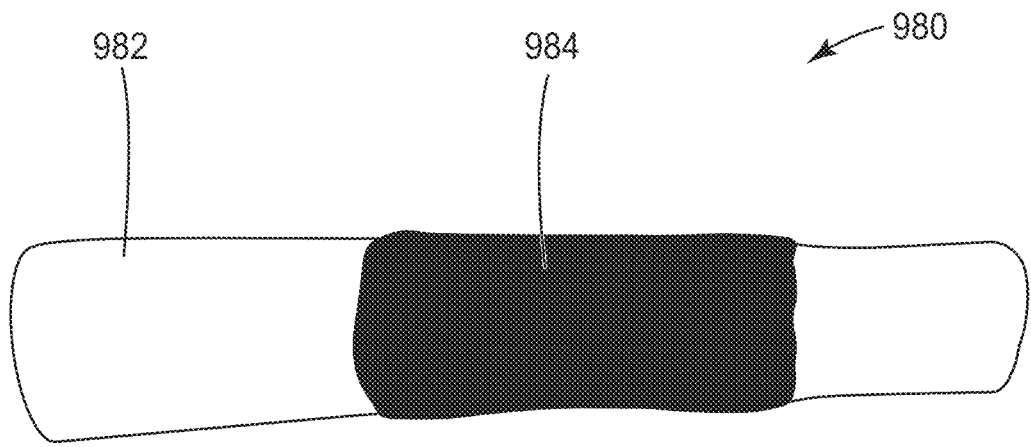
Figure 10:
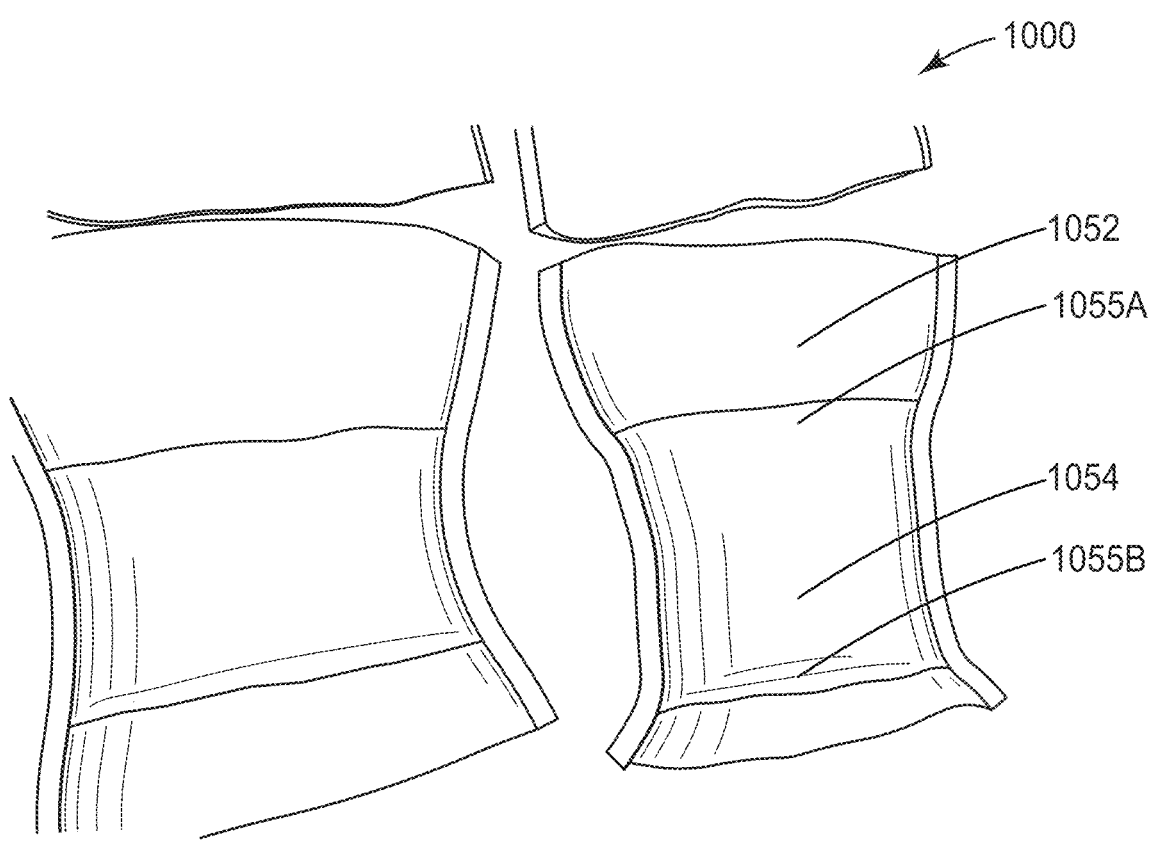
Figure 11:
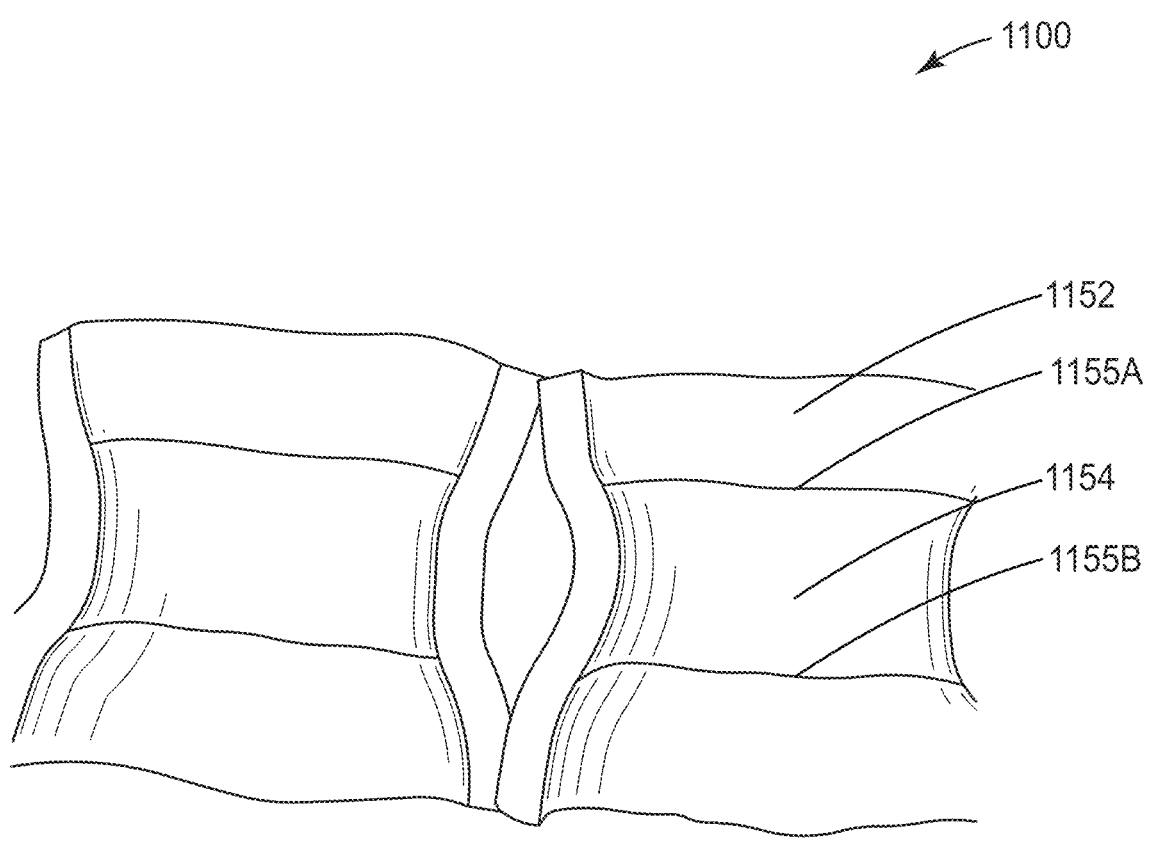

FIGS. 9-11 are photographs illustrating example electrical cable splice bodies including co-extruded multilayers including a continuous layer and a discontinuous layer. In these photographs, extruded tubes were cut open to better show the inner surface structure and composition.

As illustrated in FIG. 9A, electrical cable splice bodies 900 are cut longitudinally and folded open to reveal continuous layer 952 and discontinuous layer 954. As discussed above, discontinuous layer 954 may include a conductive material, such as a polymer impregnated with carbon black. Terminal edges 955A and 955B of discontinuous layer are substantially smooth and free of defects that may cause concentration of electrical stress and/or partial discharge events when in use. As shown in FIG. 9B, a co-extruded sample 960 was prepared in a manner similar to that described herein having a planar (clear) continuous layer 962 and discontinuous (dark) layers 964 formed thereon, wherein the exposed surface of layer 964 is generally planar with the exposed surface of layer 962. In a further aspect, the exposed surfaces can be co-planar with one another, where, for example, layer 964 can be partially or fully embedded within continuous layer 962. In a further aspect, as shown in FIG. 9C, a co-extruded sample 980 having a tube structure was prepared in a manner similar to that described herein having a clear continuous outer layer 982 and a discontinuous dark inner layer 984 formed on an inner surface of the continuous layer.

As shown in these examples, and in the articles and techniques as described herein, according to another aspect of the present invention, the transition region of the co-extruded article can be very sharp. For example, for a tubular article having an inner diameter of at least 2.5 cm, or at least 5 cm, the length of the transition region, where the inner surface layer changes from a first layer (e.g., continuous layer 962) to a second layer (e.g., layer 964), can be about 1 cm or less, preferably about 0.7 cm or less, such that the length to diameter (L/D) ratio can be about 0.3 or less, preferably about 0.25 or less.

As illustrated in FIG. 10, electrical cable splice bodies 1000 are cut longitudinally and folded open to reveal continuous layer 1052 and discontinuous layer 1054. First terminal edge 1055A is substantially smooth and free of defects that may cause concentration of electrical stress and/or partial discharge events when in use. However, second terminal edge 1055B includes smearing that may cause concentration of electrical stress and/or partial discharge events when in use. To reduce smearing, as discussed above, the rate of extrusion of the first material, the rate of extrusion of the second material, the rate of movement of the inner pin, or a combination thereof, may be controlled. For example, FIG. 11 illustrates electrical cable splice bodies 1100 are cut longitudinally and folded open to reveal continuous layer 1152 and discontinuous layer 1154. After tuning the rate of extrusion of the first material, the rate of extrusion of the second material, the rate of movement of the inner pin, or a combination thereof to reduce smearing both first terminal edge 1155A and second terminal edge 1155B are substantially smooth and free of defects that may cause concentration of electrical stress and/or partial discharge events when in use.

Various examples have been described. These and other examples are within the scope of the following claims.

What is claimed is:

1. A co-extruded multilayer article having a substantially tubular shape surrounding an interior region, comprising:
   a first layer extending continuously along a longitudinal axis from a first terminal edge of the co-extruded multilayer article to a second terminal edge of the co-extruded multilayer article, wherein the first layer comprises a first material defining a first interior surface concentric to the longitudinal axis and exposed to the interior region; and
   a second layer extending along a portion of the interior surface of the first layer from a first terminal edge to a second terminal edge, wherein the second layer comprises a second material defining a second interior surface concentric and continuous circumferentially to the longitudinal axis and exposed to the interior region.

2. The co-extruded multilayer article of claim 1, wherein at least one of the first material and the second material comprises a generally uniaxially aligned polymer.

3. The co-extruded multilayer article of claim 1, wherein the body is substantially free of at least one of subtractive manufacturing tool marks, parting lines, and gate marks.

4. The co-extruded multilayer article of claim 1, wherein the co-extruded multilayer article comprises a plurality of bodies, wherein the second layer is periodically discontinuous.

5. The co-extruded multilayer article of claim 1, wherein the first material comprises an electrically insulative polymeric material and wherein the second material comprises an electrically conductive polymeric material.

6. The co-extruded multilayer article of claim 1, wherein the co-extruded multilayer tube comprises a cable accessory, and wherein the second layer comprises an electrode centrally disposed in the cable accessory.

7. The co-extruded multilayer article of claim 6, wherein the cable accessory comprises a power cable splice device.

8. The co-extruded multilayer article of claim 1, wherein the second interior surface and the first interior surface have substantially the same inner diameter.

9. The co-extruded multilayer article of claim 1, wherein the second layer is partially embedded in a portion of the first layer.

10. The co-extruded multilayer article of claim 1, wherein the first and second terminal edges of the second layer are adjacent to the first inner surface of the first layer.

11. The co-extruded multilayer article of claim 1, wherein the second layer comprises a single second layer disposed between the first and second terminal edges of the co-extruded multilayer article.

* * * * *